United States Patent [19]
Busigny et al.

[11] 4,122,300
[45] Oct. 24, 1978

[54] DATA TRANSMISSION SYSTEM AND APPLICATION THEREOF TO THE TRANSMISSION OF ANALOG SIGNALS AND OF DATA IN A NETWORK WITH DELTA MODULATION

[75] Inventors: René Busigny, Gif sur Yvette; Pierre H. Fuerxer, Paris, both of France

[73] Assignee: Compagnie Industrielle des Telecommunications Cit-Alcatel, Paris, France

[21] Appl. No.: 777,824

[22] Filed: Mar. 15, 1977

[30] Foreign Application Priority Data

Mar. 19, 1976 [FR] France .................... 76.08052

[51] Int. Cl.² ........................... H04L 25/00
[52] U.S. Cl. .................... 178/68; 325/38 B
[58] Field of Search ......... 332/11 D; 325/30, 38 B, 325/38 R, 38 A; 178/66 R, 67, 68

[56] References Cited

U.S. PATENT DOCUMENTS

| 3,866,147 | 2/1975 | Couvreur et al. | 325/38 A |
| 3,937,897 | 2/1976 | Song | 325/38 B |

*Primary Examiner*—Benedict V. Safourek
*Attorney, Agent, or Firm*—Roland Plottel

[57] ABSTRACT

The invention relates to a system for data transmission in analog form in which data is coded such that a pulsed bivalent signal is obtained which can be physically integrated; this bivalent signal, considered as formed by a juxtaposition of elementary bits at a higher rate is processed in a DELTA demodulator as if these elementary bits were the digital representation of an analog signal which has undergone a corresponding DELTA modulation. Data is transmitted in the form of the analog signal delivered by this demodulator. On reception, the analog signal received is applied to a DELTA modulator which operates preferably in slope overload and which supplies a DELTA bit train reproducing the bivalent transmission signal of the transmission and enabling the signals to be restored after decoding.

16 Claims, 8 Drawing Figures

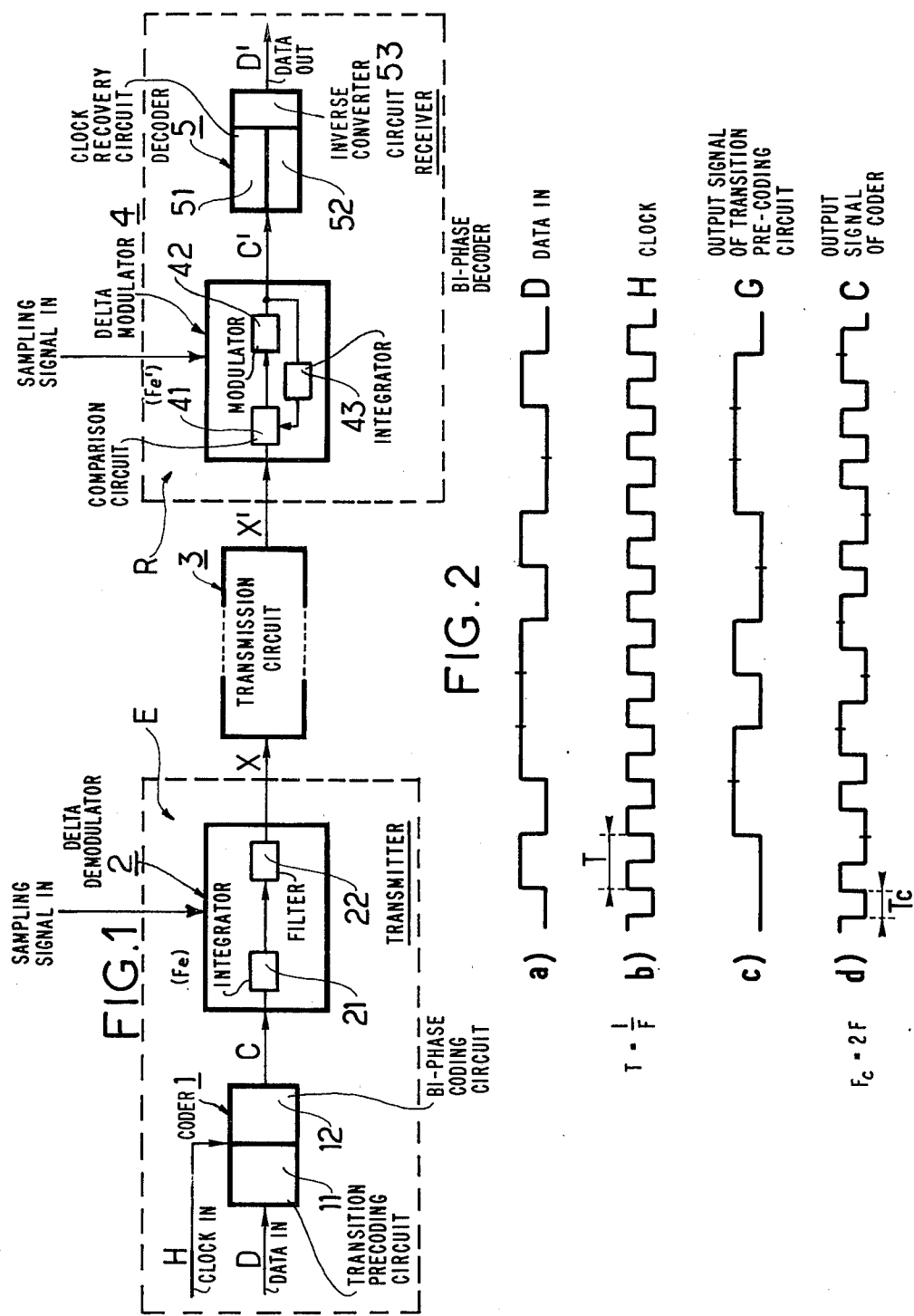

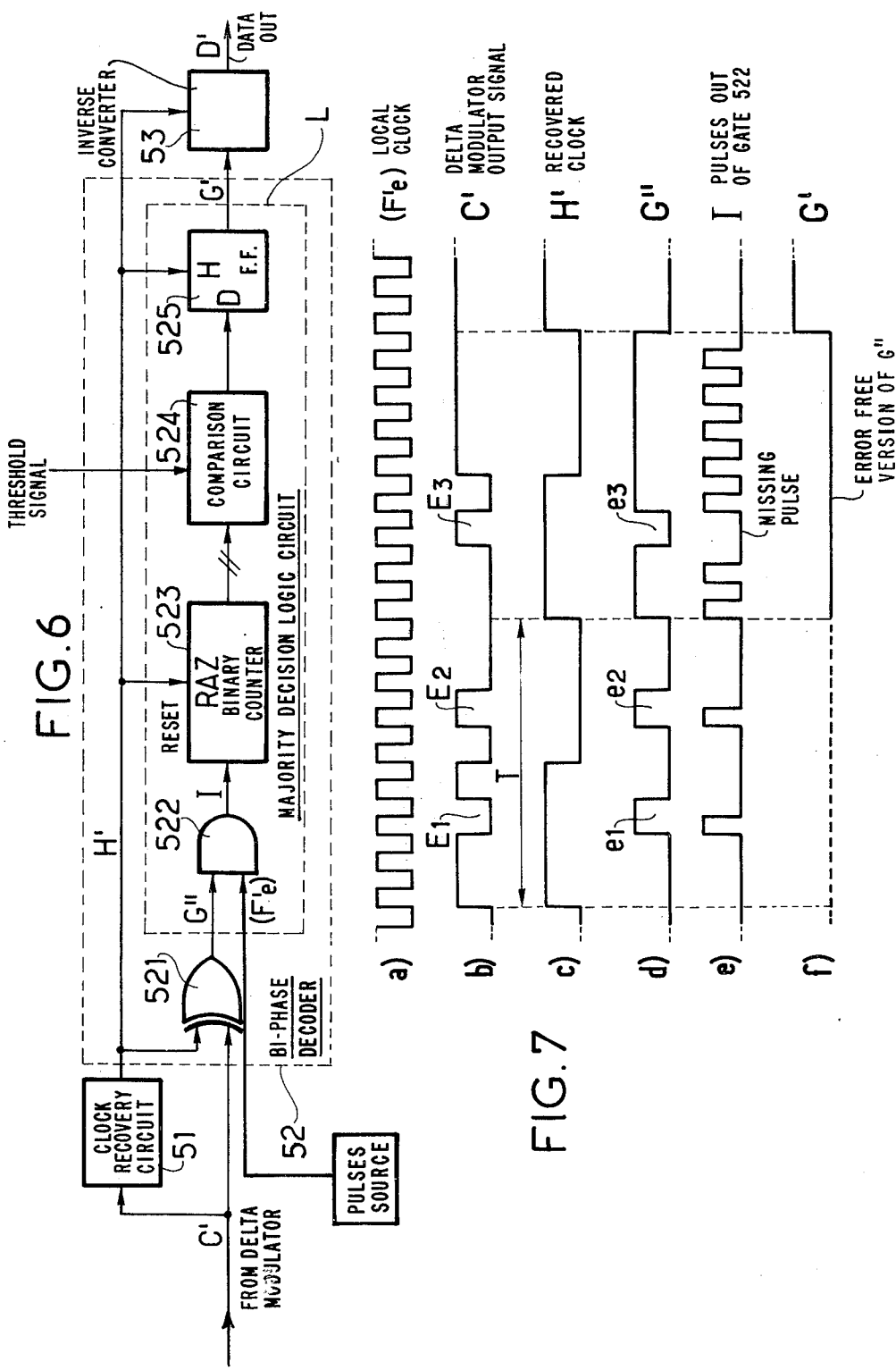

DATA TRANSMISSION SYSTEM AND APPLICATION THEREOF TO THE TRANSMISSION OF ANALOG SIGNALS AND OF DATA IN A NETWORK WITH DELTA MODULATION

The present invention is concerned with data transmission. It relates in particular to a data transmission system comprising an analog transmission circuit together with means for applying data to the circuit in analog form and means for reconstituting and delivering said data after analog transmission.

A particular application for the invention is in the realisation of an installation for the transmission of an analog signal or of binary data by means of a single transmission circuit, comprising a first DELTA modulator-demodulator situated upstream from said single circuit connected in cascade with a second DELTA modulator-demodulator assembly situated downstream from the said single circuit.

For data transmission in analog form, whether directly on an analog transmission line or via a more complex transmission circuit including an analog line at each end, the frequency, phase or amplitude of a carrier frequency can be modulated by the data to be transmitted so as to obtain an analog signal whose spectrum falls in the frequency band which can be transmitted by such a transmission line. This analog signal is applied to a transmission circuit. On reception, the frequency, phase or amplitude of the received analog signal is demodulated according to the type of modulation chosen to reproduce the data.

Such a method is used in particular in the case where data signals are transmitted through a telephone network, this being current practice for low-speed data signals e.g. telegraph and telex signals. In such a case, the preceding modulation supplies analog signals which are in the telephone pass band. These analog signals are applied to the network via a switch which is also connected to a source of analog voice signals, so as to enable the transmission of one of these two types of analog signals.

It is also known in some telephone networks that signals are transmitted along some portions of a connection in analog form while along other portions of the same connection they are transmitted in digital form. Such a connection is equipped with modulation-demodulation assemblies enabling the coding of analog signals which are in the telephone pass band and which correspond to voice signals (or to data signals after modulation in the case where the network transmits both types of data) followed by reversion to analog transmission after intermediate digital transmission.

In some cases, the digital coding method used is DELTA modulation and its well-known principle is reviewed hereinbelow:

The analog signal to be coded is compared with a comparison signal. The signal resulting from this comparison is sampled periodically and the successive samples are coded to form a binary train whose successive bits define the sign of the difference between the signals compared at the sampling instants. The comparison signal is generally called the reconstituted signal and is generated in a local decoder by integrating the binary train which constitutes the coded signal. The binary train can be integrated by using a fixed gain (simple DELTA modulator) or as is the more usual case, by using a gain which varies according to the pattern of the binary train (self-adapting DELTA modulator).

The DELTA binary train is demodulated by means of a decoder which is identical to the local decoder used for modulation. The decoder is followed by a band-pass filter which eliminates the frequencies situated outside the spectrum of the analog signal which was coded and delivers a signal reproducing this analog signal.

Preferred embodiments of the present invention provide a system for data transmission in analog form which can be used for the transmission of an analog signal (e.g. voice signal) or of data, discussed above, in which the processing operations applied to the data is simplified.

Firstly the invention provides a data transmission system including an analog transmission circuit for conveying data which the system receives and delivers in digital form wherein the system comprises at a transmission end, a coder for coding said data into a bivalent signal clocked at a frequency $Fc$, not having any d.c. component and whose transitions are separated by intervals of time lasting at the most as long as a given period and a DELTA demodulator processing said bivalent signal with a sampling frequency $Fe$ substantially higher than the frequency $Fc$ and delivering an analog signal which is applied to said transmission circuit; and at a receiving end a DELTA modulator receiving the analog signal delivered by the transmission circuit to process it with a sampling frequency $F'e$ substantially higher than the frequency $Fc$ and to deliver a train of DELTA bits forming a bivalent signal $C'$ and a decoder receiving the signal $C'$ and providing a conversion which is the inverse of that of said coder.

Therefore according to the invention the data to be transmitted is coded in a code such that a clocked bivalent signal is obtained which can be physically integrated. It is then possible to consider this bivalent signal as formed by a juxtaposition of elementary bits at a higher rate and to treat these elementary bits in a DELTA demodulator as if they were the digital representation of an analog signal which has undergone a corresponding DELTA modulation. The analog signal delivered by the demodulator is transmitted. On reception the analog signal received is applied to a DELTA modulator which supplies a train of DELTA bits reproducing the bivalent signal of the emission (indeed, modulation and demodulation are inverse functions) and hence restoring the data after decoding.

With a view to reproducing this bivalent signal more faithfully, preferably the operation mode of the DELTA modulator is determined so that the analog signal delivered by the transmission circuit will be in the slope overload region of the modulator, i.e. in the region where the restored signal of the modulator cannot follow the input signal of the modulator properly because the slopes of this signal are too steep; it is known that this phenomenon results in long sequences of identical bits in the output binary train of the modulator.

Further, the sampling frequencies $Fe$ and $F'e$ of the demodulator and of the modulator respectively are preferably equal.

The invention also provides an installation for the transmission of an analog signal $A$ or of data by means of a same transmission circuit receiving and delivering in analog form the data which it transmits, comprising a first DELTA modulator-demodulator assembly situated upstream from said transmission circuit and a second DELTA modulator-demodulator assembly situated downstream from this circuit and implementing the system according to the invention in which the demodulator of said device and the modulator of said first assembly are constituted by a single demodulator whose output is connected to said same transmission circuit and whose input is connected to the output of the modulator of said first assembly and to the output of said coder via a switch positioned so as to make effective the first or the second of these two connections according to whether it is required to transmit the analog signal or the data and wherein the modulator of said device and the modulator of said second assembly are constituted by a single modulator whose input is connected to the output of said same transmission circuit and whose output is connected to the input of the demodulator of said second assembly and to the input of said decoder.

Preferably, said single modulator has two operation modes a first of which is optimized for the signal received by this single modulator in the case of transmission of the analog signal A and a second of which is determined so that the signal received by this single modulator in the case of data transmission is in the slope overload region of the modulator, the installation being provided with a discrimination circuit which detects whether the signal delivered by said same transmission circuit represents an analog signal or data for setting said single modulator in its first operation mode in the case of detection of an analog signal and in its second operation mode in the case of data detection.

Other characteristics and advantages of the invention will become apparent from the following description of an embodiment of the system and of the complete installation and given with reference to the accompanying drawings in which:

FIG. 1 is a block diagram of a data transmission system according to the invention;

FIG. 2 shows diagrams of signals relating to the system of FIG. 1;

FIG. 6 is a particular embodiment of an assembly of the system of FIG. 1;

FIG. 7 illustrates the operation of the assembly of FIG. 6;

Figure 3:
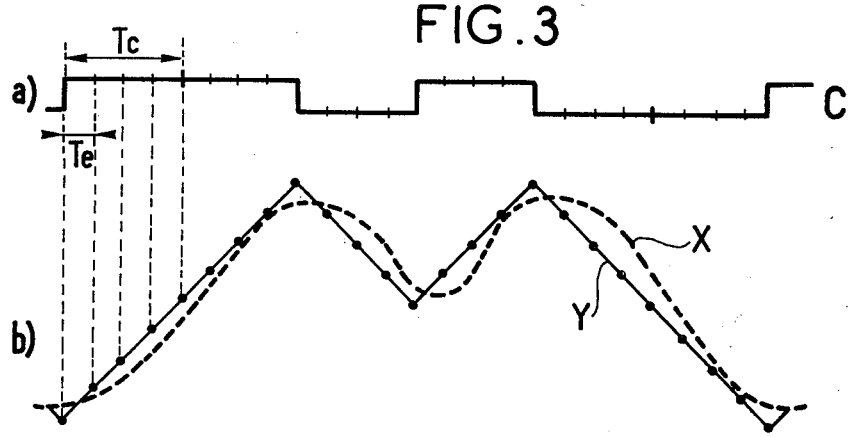
FIGS. 3, 4 and 5 are graphs illustrating the operation of the system of FIG. 1.

In FIG. 1, input data D is applied to a transmission system embodying the invention and which has an output delivering output data D' reproducing the input data D.

The device illustrated comprises a transmission side E having a coder 1 which receives the input data D, this data being for example in the form of a train of bits so timed by a clock signal H at a frequency F that each data period has a duration T = 1/F. The coder 1 codes the data train D into a bivalent signal C, pulsed at a frequency Fc, according to a code such that the signal C has no D.C. component and that its transitions are spaced by intervals of time of form $k/Fc$ where $k$ is an integer varying between 1 and a fixed upper limit K. Miller code (still called "Delay Modulation"), and biphase code, are well-known examples of a code of this type. By way of illustration, a description will subsequently be given of the case of a biphase code preceded according to current practice by transition precoding.

As shown, the coder 1 receives the clock signal H and comprises a transition precoding circuit 11 followed by a biphase coding circuit 12. The characteristics of the signal C in these conditions will be set forth with reference to FIG. 2.

The signal C is applied to a DELTA demodulator 2 which can be of any known type. The DELTA demodulator 2 processes the signal C with a sampling frequency which is substantially higher than the frequency Fc and delivers in response an analog signal X. The demodulator 2 is illustrated conventionally equipped with an integrator assembly 21 followed by a filter 22. Subsequently, the output signal of the integrator assembly 21 will be called Y.

The signal X which constitutes an analog representation of the data D is transmitted via a transmission circuit 3 which can be a simple analog transmission line or else a more complex circuit having an analog line at each end. By way of indication if the data D is pulsed at a frequency F = 2400 Hz for example, the circuit 3 can be a telephone transmission circuit.

On the reception side R of the device, the transmission circuit 3 delivers a signal X' which may be either the signal X as directly transmitted or else a reconstruction of the signal X after various intervening transmission modes (not shown). The signal X' is applied to a DELTA modulator which processes this signal with a sampling frequency F'e which is substantially higher than the frequency Fc; it is advantageous to choose the frequency F'e so that it is equal to the frequency Fe. As will be seen hereinbelow, this DELTA modulator (which can be of any known type) operates preferably in slope overload region for the signal X'. The modulator 4 has been shown conventionally equipped with a comparator circuit 41 followed by a modulator circuit 42 and a feed back loop comprising an integrator assembly 43. The output signal of the integrator assembly 43 which is compared in the comparator circuit 41 with the signal X' will be referenced Y'.

The modulator 4 delivers a train of DELTA bits at the rate of F'e, forming a signal C' which is, as will be seen hereinbelow, a reproduction of the signal C. A decoder 5 ensuring the inverse conversion to that of the coder 1 and which is therefore a two-phase transition decoder in the example in question, converts the signal C' into the data train D' thereby reproducing the data train D.

The decoder 5 comprises in a known way a circuit 51 for recovery of the clock signal H defining the rate of the data train D and a two-phase decoding circuit 52 followed by a circuit 53 ensuring the inverse conversion to that of the circuit 11. A detailed description will be given hereinbelow with reference to FIG. 6 of a preferred embodiment of the decoder 5 in which the decoding circuit is provided with a majority decision logic assembly.

FIG. 2 brings out the characteristics of the signal C generated by the two-phase transition coder 1 which is not shown in detail since it is of a well-known type.

A wave-form (a) shows a particular example of a data train D and a wave-form (b) shows the clock signal H with a period T = 1/F. A wave-form (c) shows the signal, generated in response to the data train D by the transition precoding circuit 11. This signal is referred to as the precoded signal G. According to this precoding, a "1" bit of the data train D is coded by a transition which occurs at the end of its data period while a "0" bit is coded by an absence of such a transition. The signal C, which is shown by a wave-form (d) is the result of the precoded signal G being encoded by the phase of the clock signal H; when the value of the precoded signal G is "0" the clock signal H is reproduced as it is; when the value of the signal G is "1," the clock signal H is reproduced phase shifted by 180°. The signal C thus obtained has a transition in the middle of each data period of the train D and also at the end of each data period of the train D for which the data is "0." In this case, the frequency Fc is twice the frequency F and the transitions of the signal C are separated at the most by two periods $Tc = 1/Fc$ (hence $K = 2$) i.e. at the most by one period T.

Figure 4:
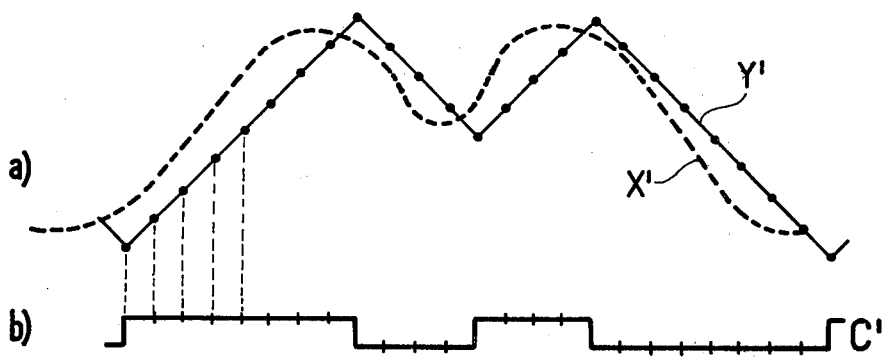
Figure 5:
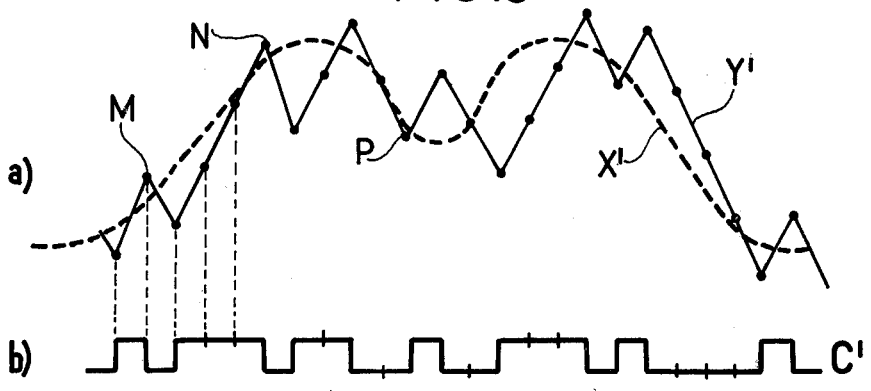

FIGS. 3, 4 and 5 show wave-forms illustrating the operation of the DELTA demodulator 2 and of the DELTA modulator 4 in the device according to FIG. 1.

In FIG. 3, a wave-form (a) shows a particular configuration of the signal C. The period Tc is shown as well as the sampling period $Te = 1/Fe$ of the demodulator 2. For this graph, we have $Fe/Fc = 4$.

A wave-form (b) relates to the demodulator 2 and shows the signal Y which is obtained by integration in the integrator assembly 21 of the signal C which is then considered as formed by the juxtaposition of elementary bits at the sampling frequency Fe. The analog signal X obtained by filtration of the signal Y is shown in dotted lines on this same diagram.

The elementary bits of the signal C form successive groups of bits of the same value in which there is never an isolated bit with a different value from that of the adjacent bits. The demodulator 2 therefore operates in very steep slope overload and the absolute value of the slope of the signal Y is always equal to the maximum value fixed by the integration conditions in this demodulator.

Here, it will be observed that said successive groups of bits of a same value can comprise up to N bits, N being equal to $K \cdot (Fe/Fc)$ or, if this product is not an integer, the integer which is immediately greater; the integration conditions of the demodulator 2 are therefore determined so as to enable the integration of such groups without any appreciable saturation phenomenon occurring. In the case in question, $N = 2 \times 4 = 8$.

FIGS. 4 and 5 illustrate two different cases of operation of the modulator 4 whose sampling frequency has also been taken equal to four times the frequency Fc.

In FIG. 4, in a wave-form (a) the signal X' identical to the signal X of FIG. 3 is shown in dotted lines and the signal Y' generated in response by the integrator assembly 43 has also been shown. The integration conditions of the modulator are fixed so that this modulator will operate in slope overload, i.e. during each sampling period, the signal Y' is incremented or decremented by an insufficient quantity for it to be able to "catch up" with the signal X'. The signal Y' is then always smaller than the signal X' during the rising sides of this signal X' and always greater during the descending sides. The signal C' at the output of the modulator is therefore formed by successive groups of DELTA bits of same value and thus correctly reproduces the signal C.

Integration conditions leading to slope overload operation for this signal X' are determined as a function of the slope of this signal, this slope itself being a function of the integration conditions in the demodulator 2. It is not difficult for the man in the art to determine these conditions; therefore no examples will be given thereof.

Overload operation is not indispensable for the modulator 4, although it is advantageous. FIG. 5 shows how the signals Y' and C' are modified in respective wave-forms (a) and (b), in a case where the overload condition is not fulfilled. This time, the signal Y' catches up with the signal X' which is then no longer coded exclusively by successive groups of bits of same value: when the signal Y' overtakes the signal X', as for example at M, N, P, . . . , a bit of opposite value is inserted in successive groups of "1" or "0" bits of the signal C'. Thus, the first rising part of the signal X', which was coded in groups of eight successive "1" bits in FIG. 3 is here coded by the sequence "10111011." The signal C' then reproduces the signal C with errors but as will be seen, such errors can be eliminated in the majority decision logic decoder 5.

FIG. 6 shows a particular embodiment of the two-phase transition decoder 5 equipped with a majority decision logic element, comprising the circuits 51, 52 and 53 of FIG. 1.

In FIG. 6, the signal C' coming from the modulator 4 (FIG. 1) is applied to the clock recovery circuit 51 which can be of any known type and which delivers a signal H' with period T restoring the clock signal H. The signal C' is also applied to the circuit 52 to one input of an EXCLUSIVE OR gate 521 which receives the recovered clock signal H' on its other input for decoding the phase of the signal C' by a simple comparison of levels in a known way. The gate 521 delivers a signal G" which reproduces the precoded signal G of the transmission side, at least to within a few errors where the signal C' received in the decoder happens contain errors.

With a view to obtaining a signal C' which reproduces correctly the signal G, the signal G" is applied to a majority decision logic assembly L. In this assembly, clock pulses with a frequency F'e of the DELTA bits of the signal C' are applied to a first input of an AND gate 522 whose opening and closing is controlled by the signal G" which is applied to a second input of this gate. These pulses with a frequency F'e can be generated e.g. by a local clock (not shown), synchronized by the signal C'.

Each pulse I, which leaves the gate 522 thus corresponds to one "1" bit of the signal G" as decoded by the gate 521 from the signal C'. These pulses I are counted in a counter 523 which has a capacity at least equal to the maximum number (N') of pulses at the frequency F'e contained in one period T of the clock signal H'. The counter 523 receives the clock signal H' on a "reset to zero" input (RAZ). Thus at the end of each period T, just before it is reset to zero by the signal H' the counter 523 reaches a count equal to the number of DELTA bits of the signal C' in this period for which the two-phase decoding by the gate 521 supplies a "1" bit.

The signal G' is determined by this last number: if this number is greater than or equal to N'/2, (i.e. if for the period T in question at least as many DELTA bits are decoded by "1" bits as are decoded by "0" bits) it is decided that for this period, the bit decoded is "1" and therefore that the value of the signal G' is "1"; in the contrary case, it is decided that the value of this signal is "0."

To do this, the count of the counter 523 is compared, in a comparison circuit 524, with N/2 (or N+1/2 where N is an odd number). The result of this comparison is delivered in the form of a logic signal which is sampled at the end of each period T, just before the counter 523 is reset to zero, by means of a D type bistable flip-flop, controlled by the clock signal H'. The signal G' delivered by the assembly is found at the output of the flip-flop.

It will be observed that when there is a phase drift between the signals H' and C', narrow interference pulses can enter the signal G" at the output of the EX-CLUSIVE OR gate 521. These interference pulses are eliminated e.g. by means of a simple resampling flip-flop (not shown) placed at the output of this gate.

The data train D' reproducing the data train D of the transmission is generated by the circuit 53 from the signal C' and the signal H'. This circuit 53, which reverse converts the transition coding is of a known type and has not been shown in detail.

In FIG. 7 which illustrates the operation of the decoder 5 of FIG. 6, as previously, $F'e/Fc$ is taken to be equal to 4, i.e. $Fe/F = 8$. The pulses with a frequency $F'e$ are shown as a wave-form (a). The signal C' which is shown in wave-form (b) over two periods T of the signal H' which is itself shown in wave-form (c). Over the one period T there are two errors E1 and E2 in the signal C' and over the second period T there is one error E3. These errors are propagated at $e1$, $e2$ and $e3$ respectively, on the derived signal G" shown in the wave-form (d). The pulses I are shown in wave-form (e). During the first period T there are only two pulses I, corresponding to the errors $e1$ and $e2$: at the end of this period, the value of G' in the comparison circuit 524 is therefore "0." During the second period T, there are seven pulses I, the missing pulse corresponding to the error $e3$: therefore at the end of this period the value of G' in the comparison circuit is "1." The signal G' which is represented in wave-form (f) (and which quite evidently is shifted by a period T in relation to the signal G") is thus free from the errors contained by the signal G".

It will be observed that the decoder 5 of FIG. 6 makes it possible to eliminate not only errors due to the modulator 4 but also some errors which could arise during the digital transmission between the coder 1 and the demodulator 2 when these two circuits are distant from each other and between the modulator 4 and the decoder 5, also when these two circuits are distant from each other (FIG. 1).

Figure 8:
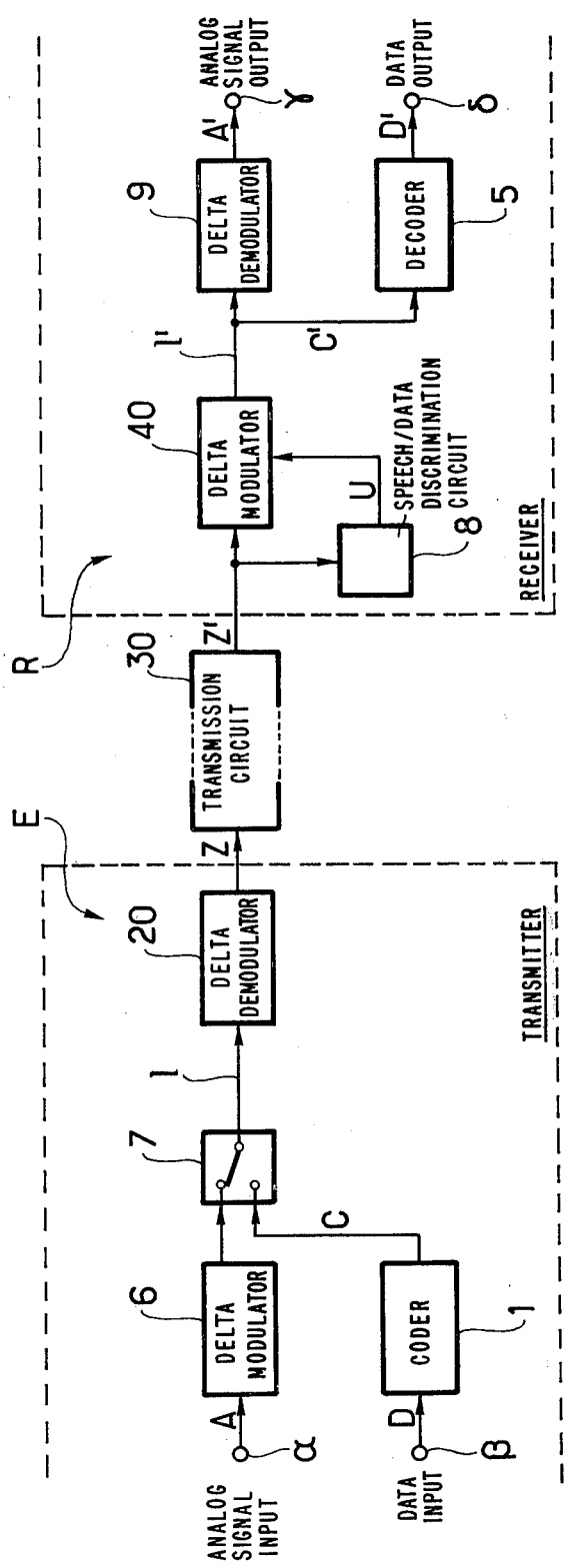
FIG. 8 is a block diagram of an installation for the transmission of analog signals or of data according to the invention.

FIG. 8 is a block diagram of an installation embodying the invention and arranged for the transmission of an analog signal A or of binary data D. It uses the system of FIG. 1. Identical reference numerals in these two figures designate respectively identical elements.

By way of illustration, it will be considered that the analog signal A is a voice signal and that the data D is clocked at a frequency of 2400 Hz.

The installation comprises an input $\alpha$ for the voice signal A and an input $\beta$ for the data D. When a signal A is transmitted, the installation delivers an analog signal A on an output $\gamma$ reproducing the signal A; when the data D is transmitted, the installation delivers the data D' reproducing the data D on an output $\delta$.

On the transmission side E, the installation comprises a DELTA modulator 6 which is preferably self-adapting, whose input is connected to the input $\alpha$. The modulator 6 operates in connection with a DELTA demodulator 20 to form a modulation-demodulation assembly for the signal A. The sampling frequency common to the modulator 6 and to the demodulator 20 is e.g. 19.2 Khz. The input $\beta$ of the installation is connected to the coder 1 which delivers the signal C when data D is applied to this input. A switch 7 followed by a digital transmission line makes it possible to connect either the output of the modulator 6 or the output of the coder 1 to the input of the modulator which is applied to the installation. For the data D, the demodulator 20 fulfills the same function as the demodulator 2 of FIG. 1.

The demodulator 20 delivers an analog signal Z which therefore represents either the signal A or the data D according to the kind of signal applied to the installation. In the first case it reproduces the signal A and therefore in the example in question the characteristics of a voice signal; reference will be made to a first form Z1 of the signal Z. In the second case it has the characteristics of the signal X of the device according to FIG. 1; reference will be made to a second form Z2 of the signal Z. However, in both cases, the signal Z is in the telephone pass band.

The signal is applied to a transmission circuit 30 analogous to the transmission circuit 3 of FIG. 1 and delivering a signal Z' on the reception side R of the installation which can be a reproduction of the signal Z or else the signal Z itself and which therefore is in one of the forms Z'1 or Z'2 corresponding respectively to the forms Z1 and Z2 of the signal Z.

The signal Z' is applied to a DELTA modulator 40 whose sampling frequency is e.g. also 19.2 Khz and which preferably has two operation modes. A first of these two modes corresonds to self-adapting operation, optimized for the form Z'1 of the signal Z' (hence optimized for a voice signal), this operation being for example the same as that of the modulator 6; a second of these two modes corresponds to operation determined so as to produce slope overload operation for the form Z'2 of the signal Z'.

A circuit 8 referred to as the speech/data discrimination circuit, also receives the signal Z' and detects if this signal represents a voice signal A or data D. The result of the discrimination is delivered in the form of a logic signal U which is applied to a control input of the modulator 40 to set this modulator in its first or second operation mode according to whether the circuit 8 recognizes a voice signal or data.

The circuit 8 can be for example of the same type as the one described in French Pat. No. 7525421 in which the discrimination is carried out after an examination of the average power of the signal to be examined, taken over a small period of time.

In practice, to produce the modulator 40 with its two operation modes, it is sufficient for example to make a variable gain circuit controlled by the signal U precede a DELTA modulator which is optimized for a voice signal in order to apply a gain of 1 to the signal Z' when the circuit 8 recognizes a voice signal and in order to apply a gain greater than 1 to the signal Z' when the circuit 8 recognizes data so that in this case, the amplitude of the signal will be brought back to the input of said optimized modulator in the slope overload region of this modulator.

The modulator 40 which, in the case of transmission of the data D, fulfills the same function as the modulator 4 of the device of FIG. 1, is connected via a digital transmission line 1' to the input of a DELTA demodulator 9 and to the input of the decoder 5. In its first operation mode, the demodulator 9 forms with the modulator 40 a modulation-demodulation assembly for the signal Z'1. When a signal A is transmitted, the demodulator 11 thus delivers a signal reproducing the signal Z'1 and hence the signal A. This signal at the output of the demodulator constitutes the signal A' and is applied to an output $\gamma$ of the installation.

The data D' delivered by the output δ when the data D is transmitted is collected at the output of the decoder 5 which in this case receives the signal C'.

A particular embodiment of a data transmission system according to the invention as well as a particular example of an installation implementing this system have been described; it is however quite evident that modifications can be made thereto and/or that some means can be replaced therein by other technically equivalent means.

It must be understood that two-phase coding has been described only by way of illustration and that any other type of code which is able to supply a signal which can be integrated in the DELTA demodulator could be used.

Further, in the installation of FIG. 8, the two operation modes of the DELTA modulator of the reception unit could be obtained by modification of the integration gain variation law of this modulator. Two operation modes could be provided for the transmission unit DELTA demodulator. The DELTA modulator of the reception unit could also have only one operation mode. Further, it is quite evident that the circuits of the transmission unit can be geographically distant from one another, this also being possible for the circuits of the reception unit.

What we claim is:

1. A data transmission system for transmitting a digital signal D from a first to a second location over an analog transmission channel, said system comprising:
   at said first location:
   a source of a system clock signal H of frequency F;
   a coder, connected to and synchronized with said system clock signal, for coding said digital signal D into a bivalent signal C, said bivalent signal having no D.C. component, the transitions in said bivalent signal being separated by intervals of time given by the formula $k/Fc$, $Fc = 2F$, and where $k$ is an integer, $1 \leq k < K$, and $K$ is a predetermined upper limit;
   a source of a first sampling signal Fe, $Fe >> Fc$; and
   a delta modulator, connected to said first sampling signal source and to the output of said coder, for processing said bivalent signal C with said sampling C with said sampling frequency Fe, the analog output of said delta demodulator comprising the input to said analog transmission channel; and
   at said second location:
   a source of a second sampling signal F'e, $F'e >> Fc$;
   a delta modulator, connected to the output of said analog transmission channel and to said second sampling signal source, for processing the analog signal from said analog transmission channel with said sampling frequency F'e, said delta modulator delivering a train of delta bits forming a bivalent signal C'; and
   a decoder, connected to the output of said delta modulator, for decoding said bivalent signal C', said decoder providing a conversion which is the inverse of that provided by the coder at said first location.

2. A data transmission circuit according to claim 1 wherein said digital signal D comprises a train of bits choked by said clock signal H, said coder comprises a bi-phase coding circuit which receives said digital signal D and said clock signal H for bi-phase encoding thereof; and, at said second location, said decoder comprises a clock recovery circuit, connected to the output of said delta modulator, for recovering from said bivalent signal C' a recovred clock signal H' of frequency F; and a two-phase decoding circuit connected to the output of said clock recovery circuit and to the output of said delta modulator, for decoding said bivalent signal C' into a decoded signal at the rate of the signal H'.

3. A data transmission system according to claim 2 wherein said coder further comprises a transmission precoding circuit positioned intermediate the source of the data signal D and said bi-phase coding circuit; and said decoding further comprises
   a conversion circuit, connected to the output of said two-phase decoding circuit, said conversion circuit providing a conversion which is the inverse to that provided by said transition coding circuit.

4. A data transmission system according to claim 2 wherein the sampling frequencies Fe and F'e are substantially identical.

5. A data transmission system according to claim 2 wherein the delta modulator at said second location operates in the slope overload region thereof.

6. A data transmission system according to claim 2 wherein said two-phase decoding circuit comprises:
   an exclusive OR-gate having a first input connected to said clock recovery circuit to receive said recovered clock signal H' and a second input connected to the output of said delta modulator to receive said bivalent signal C', said exclusive OR-gate effecting said two-phase decoding by comparison of the levels of the signals C' and H'; and
   a majority decision logic circuit having a first input connected to the output G" of said exclusive OR-gate and a second input connected to said source of a second sampling signal F'e, said majority decision logic being further connected to the output of said clock recovery circuit H', said majority decision logic circuit determining, in each period of the signal H', the number of delta bits of the bivalent signal C' for which said exclusive OR-gate supplies a decoded data signal having a first predetermined value and for generating, for this period of the signal H', a decoded data signal having said first predetermined value or a second predetermined value according to whether said number of delta bits is or is not equal to a given threshold of approximately half the number of delta bits at the frequency F'e contained in the period of the signal H'.

7. A data transmission system according to claim 6 wherein said coder further comprises a transition precoding circuit positioned intermediate the source of the data signal D and said bi-phase coding circuit; and said decoding further comprises
   a conversion circuit, connected to the output of said two-phase decoding circuit, said conversion circuit providing a conversion which is the inverse to that provided by said transition coding circuit.

8. A data transmission system according to claim 6 wherein the sampling frequencies Fe and F'e are substantially identical.

9. A data transmission system according to claim 6 wherein the delta modulator at said second location operates in the slope overload region thereof.

10. A data transmission system according to claim 6 wherein said majority decision logic circuit comprises:
   an AND-gate having a first input connected to the G" output of said exclusive OR-gate and a second input connected to said source of the second sampling signal F'e for transmitting the pulses comprising the signal G" depending on whether said pulses have said first or said second predetermined value;

a digital counter connected to the output of said AND-gate, for counting the number of pulses output therefrom, said counter also being connected to said clock recovery circuit and being reset to zero by the clock signal H' at the end of each period of this signal;

a comparison circuit connected to the output of said digital counter, for comparing the count stored therein with said given threshold, said comparison circuit generating an output signal which is representative of the results of said comparison; and means, connected to said comparison circuit and to the output of said clock recovery circuit, for sampling the output signal from said comparison circuit at the end of each period of the bivalent signal H', just before said counter is reset to zero.

11. A data transmission system according to claim 10 wherein said coder further comprises a transition precoding circuit positioned intermediate the source of the data signal D and said bi-phase coding circuit; and said decoding further comprises a conversion circuit, connected to the output of said two-phase decoding circuit, said conversion circuit providing a conversion which is the inverse to that provided by said transition coding circuit.

12. A data transmission system according to claim 10 wherein the sampling frequencies Fe and F'e are substantially identical.

13. A data transmission system according to claim 10 wherein the delta modulator at said second location operates in the slope overload region thereof.

14. A data transmission system according to claim 11 wherein, for alternately transmitting said digital signal D and an analog signal A, said system further comprises:

at said first location:

a delta modulator, connected to said first sampling signal source and to the source of said analog signal A, for processing the analog signal A with said sampling frequency Fe, said delta modulator delivering a train of delta bits forming a bivalent signal C"; and a switch, connected to the input of said delta demodulator and to the outputs of said delta modulator and said coder, for selectively connecting the output of said delta modulator to the input of said delta demodulator when it is desired to transmit said analog signal A and for connecting the output of said coder to the input of said delta demodulator when it is desired to transmit said digital signal D, and at said second location:

a delta demodulator, connected to the output of said delta modulator and to the source of said second sampling signal, for processing the bivalent signal from said delta modulator with said sampling frequency F'e, the analog output of said delta demodulator comprising said analog signal A.

15. A data transmission system according to claim 14 further comprising at said second location:

means, connected to the output of said analog transmission channel, for determining if the analog signal received therefrom represents said digital signal D or said analog signal A; and means, responsive to the output of said determining means, for optimizing the operation of said delta modulator.

16. A data transmission system according to claim 15 wherein said optimizing means comprises a variable gain amplifier connected to the input of said delta modulator, the gain of said amplifier being determined by said determining means.

* * * * *